W. H. DEAN.
WHEEL.
APPLICATION FILED JUNE 28, 1912.
1,068,572.
Patented July 29, 1913.
2 SHEETS—SHEET 1.
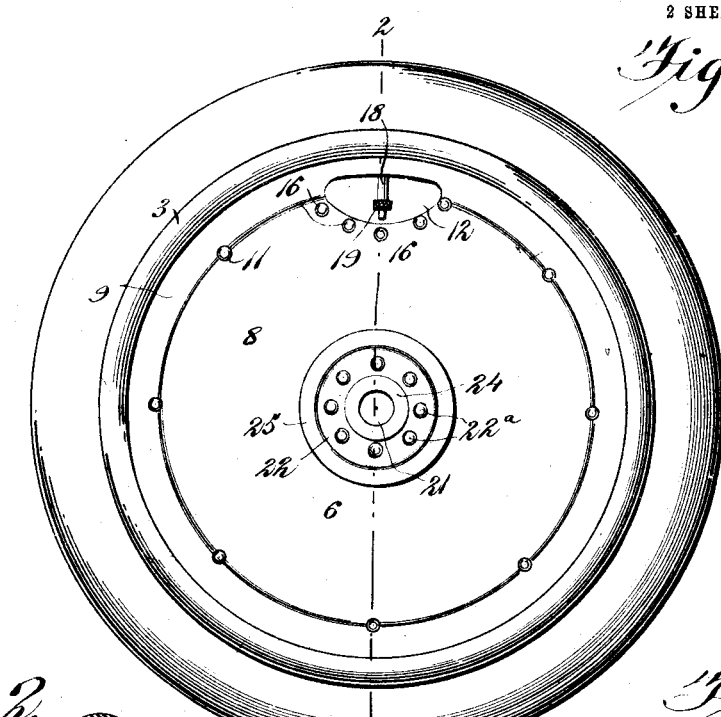
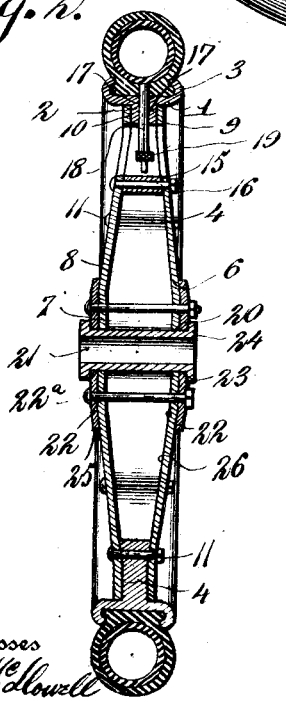
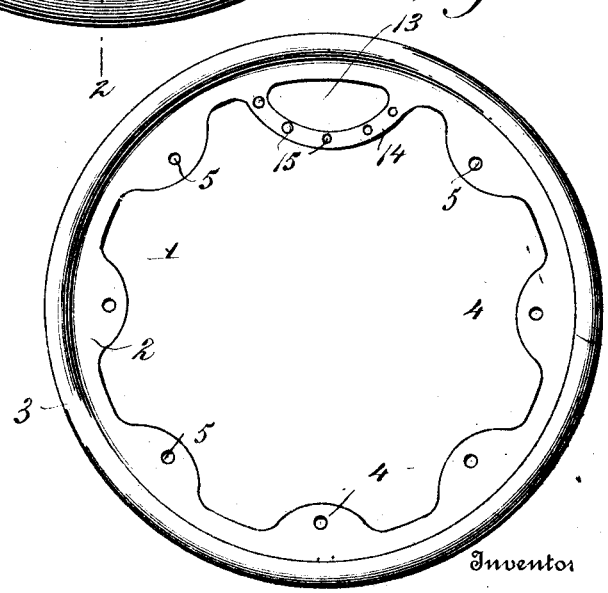
Witnesses
H. S. McDowell
Dudley B. Howard
Inventor
W. H. Dean
By Victor J. Evans
Attorney

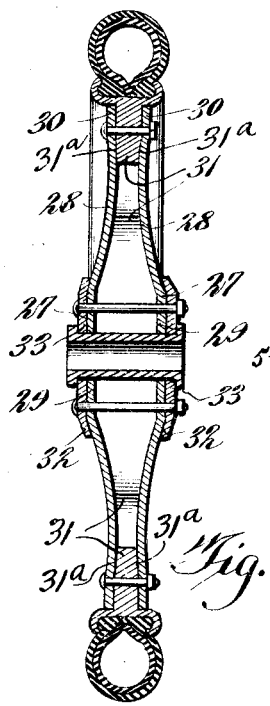

UNITED STATES PATENT OFFICE.

WILLIAM HOMEWOOD DEAN, OF NEWARK, DELAWARE.

WHEEL.

1,068,572.  Specification of Letters Patent.  Patented July 29, 1913.

Application filed June 28, 1912. Serial No. 706,533.

*To all whom it may concern:*

Be it known that I, WILLIAM H. DEAN, a citizen of the United States, residing at Newark, in the county of Newcastle and State of Delaware, have invented new and useful Improvements in Wheels, of which the following is a specification.

This invention relates to wheels, the main object being to construct a wheel entirely of metal, and to provide a construction which will afford the desired rigidity without the use of an unnecessary amount of weight and material.

A further object of the invention is to provide means for use in connection with a pneumatic tire for disposing of and shielding the valve stem.

The invention consists of the features of construction, combination and arrangement of parts, hereinafter fully described and claimed, reference being had to the accompanying drawings, in which:—

Figure 1 is a side elevation of the preferred embodiment of the device. Fig. 2 is a transverse sectional view taken on the line 2—2 of Fig. 1. Fig. 3 is a side elevation of the rim when detached. Fig. 4 is a side elevation of a modified form of the device. Fig. 5 is a transverse sectional view on the line 5—5 of Fig. 4. Fig. 6 is a side elevation of a second modification of the device. Fig. 7 is a sectional view on the line 7—7 of Fig. 6.

Referring to the drawings, and in particular to Figs. 1, 2 and 3, it will be seen that I have provided a wheel rim designated by the numeral 1 and which comprises an annular body 2 and the peripheral flanges 3 which latter are adapted to have a tire shoe attached thereto in any suitable manner. The annular body 2 is provided with inwardly extending, curved enlargements 4 at spaced intervals which are provided with transverse bolt openings 5. In the construction of the wheel, circular side plates 6 having central flattened portions 7, outwardly and inwardly converging body portions 8 and the flattened outer portions 9 are placed against either side of the rim so that their flattened outer portions 9 engage the opposite faces 10 of the annular body 2 of the rim, and are secured to the rim by means of transverse bolts 11 which pass through the flattened portions 9 and the said annular rim body. The plates 6 are provided adjacent one edge thereof with alining cut-away portions 12 which are adapted to register with the space or aperture 13 provided between the annular body portion 2 of the rim at this point and a semi-circular extension or shield 14 formed thereon. The shield 14 is provided with a plurality of spaced, transverse openings 15 adapted to receive attaching bolts 16 passing through alining openings in the side plates. An opening 17 is provided in the wheel rim in communication with the space 13 for the reception of a valve stem 18 whose inner extremity, provided with a screw cap 19, may be properly protected by the rim and the shield 14, and yet, is readily accessible when it is desired to remove the cap for inflation of the tire. The side plates 6 are provided with alined, central openings 20 which are adapted to have inserted therein a cylindrical hub member 21. A circular reinforcing plate 22 having a central opening 23 is secured to the outer face of each side plate by means of bolts 22ª and centrally with respect thereto so that its opening registers with the plate opening 20 and surrounds the outer portions of the hub member 21. The extremities of the said hub member are bent outwardly or upset so as to provide annular flanges 24 which engage the outer faces of the reinforcing plates 22. The outer portions of the reinforcing plates 22 are dished or bent inwardly, as at 25, so as to bear evenly against the inclined portions 8 of the side plates 6. It will also be noted that the shield member 14 has its side faces 26 inclined outwardly toward the center of the wheel so as to bear evenly against the said inclined portions 8 of the side plates.

In Figs. 4 and 5 I have shown a modified form of the wheel which is similar in construction to the previously described form thereof, except that the side plates 27 are concaved, as at 28, from their central flat portions 29 to their outer flat portions 30. The curved enlargements 31 and the shield (not shown) formed on the annular body portion of the rim also have their outer faces 31ª concaved so as to bear evenly against the concaved portions of the said side plates. The outer portions 32 of the reinforcing plates 33 are bent inwardly and have their inner faces concaved slightly so as to evenly contact with the said concaved portions of the side plates.

In Figs. 6 and 7 I have disclosed a still further modification, identical in construction with the previously described structures or forms of the invention, with the exception of the formation of the side plates, the reinforcing plates, and the shield. The side plates in this instance have their outer faces convexed, as at 34, from their central portions 35 to their outer flat portions 36. The reinforcing plates 37 have their outer portions bent outwardly, as at 38, to correspond with the convex surface of the side plates. The curved enlargements 39 and the shield (not shown) have their outer side faces 40 convexed so as to evenly engage the inner concaved faces of the side plates.

From this construction it will appear that I have provided a wheel constructed totally of metal and which is light in weight and yet constructed so as to be very strong and durable.

What is claimed is:

1. A wheel of the class described comprising a hub member, a pair of spaced, circular side plates provided with central openings receiving the hub member and fixedly secured thereon, a rim encircling the outer peripheries of said side plates and comprising an annular body disposed between the said plates and laterally extending peripheral flanges, an inwardly curved shield member formed on the body portion of said rim and disposed between the said side plates, said side plates being provided with alined cutaway portions in their outer edges in alinement with the recess formed between the said shield and the body portion of the rim, an inwardly extending valve stem receiving opening provided in the rim in communication with the said recess, and means for attaching the said plates to the rim and the hub member.

2. A wheel of the class described comprising a hub member, a pair of spaced, circular side plates secured centrally to said hub, the said plates converging outwardly, a rim encircling the outer peripheries of said plates and comprising an annular body portion disposed between the outer edges of the side plates and laterally extending peripheral flanges abutting the edges of said plates, a plurality of inwardly curved enlargements formed on the rim body with their side faces inclined for even contact with the inner converging faces of the side plates, and a curved shield formed on the said rim between the side plates with its side faces inclined for engagement therewith, said side plates being cut away adjacent the inner face of the shield to provide openings registering with the recess formed between the shield and the rim body, said rim being provided with a valve stem opening in communication with the said recess.

In testimony whereof I affix my signature in presence of two witnesses.

WILLIAM HOMEWOOD DEAN.

Witnesses:
S. M. DONNELL,
L. G. COLMERY.